United States Patent
Cao et al.

(10) Patent No.: US 8,162,373 B2
(45) Date of Patent: Apr. 24, 2012

(54) MOUNTING FOOT COVER FOR A MOTOR VEHICLE SEAT

(75) Inventors: Michael Cao, Dublin, OH (US); Dai Higashida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 12/487,319

(22) Filed: Jun. 18, 2009

(65) Prior Publication Data
US 2010/0320795 A1 Dec. 23, 2010

(51) Int. Cl.
*B60N 2/02* (2006.01)
(52) U.S. Cl. .................... 296/65.13; 248/345.1
(58) Field of Classification Search ............... 296/65.13, 296/65.01; 297/463.1; 248/345.1, 429; *B60N 2/44; B60N 2/02*
See application file for complete search history.

(56) References Cited

U.S. PATENT DOCUMENTS

| | | | |
|---|---|---|---|
| 5,011,209 A * | 4/1991 | Takarabe et al. ........... 296/65.14 |
| 5,188,329 A | 2/1993 | Takahara | |
| 5,242,143 A | 9/1993 | Nagashima et al. | |
| 5,275,369 A | 1/1994 | Kamata et al. | |
| 5,285,993 A * | 2/1994 | Kamata et al. ................. 248/429 |
| 5,454,541 A | 10/1995 | Ito | |
| 6,655,739 B2 | 12/2003 | Furukawa | |
| 2007/0194200 A1* | 8/2007 | Toma et al. .................... 248/429 |

FOREIGN PATENT DOCUMENTS

| | | |
|---|---|---|
| JP | 60065131 | 5/1985 |
| JP | 4087843 | 3/1992 |

OTHER PUBLICATIONS

European Search Report, dated May 13, 2011, from European Application No. 10165981.1.
European Office Action dated May 27, 2011, from European Application No. 10165981.1.

* cited by examiner

*Primary Examiner* — Glenn Dayoan
*Assistant Examiner* — Pinel Romain
(74) *Attorney, Agent, or Firm* — Plumsea Law Group, LLC

(57) ABSTRACT

A mounting system for a seat of a motor vehicle is disclosed. The mounting system includes a sliding rail, a mounting foot member and a covering member. The covering member includes a covering portion and an attachment portion. The covering portion may cover the mounting foot member. In some cases, the covering portion may cover the mounting foot member mounted in a recessed groove in a floor of a motor vehicle. The attachment portion may engage the sliding rail of the mounting system.

20 Claims, 9 Drawing Sheets

MOUNTING FOOT COVER FOR A MOTOR VEHICLE SEAT

BACKGROUND OF THE INVENTION

1. Field of the Invention

The present invention relates to motor vehicles and in particular to a mounting foot cover for a motor vehicle seat.

2. Description of Related Art

Seat slide track rails are typically positioned above the mounting floor of motor vehicles. Moreover, brackets used for mounting the slide track rails are also usually positioned above the mounting floor. However, the related art lacks provisions for covering a mounting foot that is mounted in a groove or trough of the floor panel.

SUMMARY OF THE INVENTION

The invention discloses a mounting system for a seat of a motor vehicle. The mounting system includes a sliding rail, a mounting foot member and a covering member. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a covering member for a mounting foot member in a motor vehicle, comprising: a covering portion; the covering portion including a central portion and a peripheral portion disposed outwards from the central portion; and where the central portion is recessed below the peripheral portion to provide substantial spacing between the central portion and a sliding rail.

In another aspect, the invention provides a mounting system for a seat of a motor vehicle, comprising: a sliding rail; a mounting foot member including a first portion configured to fasten to the sliding rail and a second portion configured to fasten to a floor portion of the motor vehicle; a covering member including a covering portion configured to cover the mounting foot member; the covering member including an attachment portion disposed adjacent to the covering portion; the attachment portion including at least one upwardly extending portion including a first fastening member; the attachment portion including at least one longitudinally extending portion including a second fastening member; and where the first fastening member is configured to attach to a portion of the sliding rail and wherein the second fastening member is configured to attach to the first portion of the mounting foot member.

In another aspect, the invention provides a mounting system for a seat of a motor vehicle, comprising: a sliding rail, the sliding rail including a lower rail and an upper rail configured to slide with respect to the lower rail; a mounting foot member configured to fasten the lower rail to a floor portion of the motor vehicle; a covering member including a covering portion configured to cover the mounting foot member; and where the covering portion is disposed between the upper rail and the mounting foot member when the sliding rail is in an extended position.

Other systems, methods, features and advantages of the invention will be, or will become, apparent to one of ordinary skill in the art upon examination of the following figures and detailed description. It is intended that all such additional systems, methods, features and advantages included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE EXEMPLARY EMBODIMENTS

Figure 1:
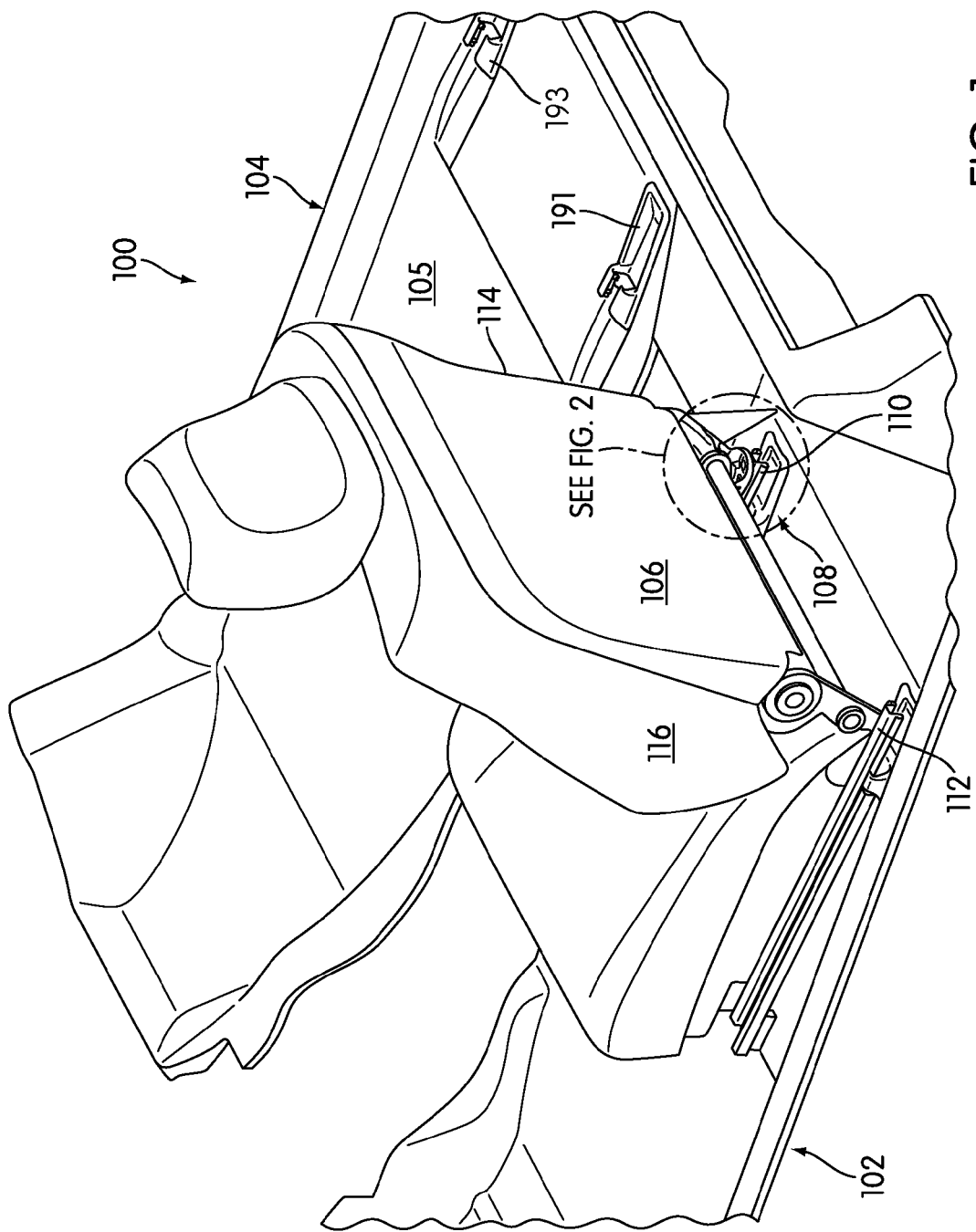
FIG. 1 is an isometric view of an exemplary embodiment of an interior portion of a motor vehicle.

FIG. 1 is an exemplary embodiment of interior portion 100 of a motor vehicle. For purposes of illustration, only some features of interior portion 100 are illustrated in this embodiment. It will be understood that in other embodiments, additional features for interior portion 100 can be provided.

Interior portion 100 can include floor portion 105. Although a carpet is not illustrated for floor portion 105 in the current embodiment, other embodiments can include a carpet for covering floor portion 105. In some cases, interior portion 100 can include seat 106 disposed on driver side 102. Generally, seat 106 can be any type of seat configured for a motor vehicle. In different embodiments, seat 106 can have any size and/or shape. Furthermore, seat 106 can be made of any combination of materials.

Interior portion 100 can include provisions for mounting seat 106 to floor portion 105. In some cases, seat 106 can fixedly mounted to floor portion 105. In other cases, however, seat 106 may be adjustably mounted to floor portion 105. In other words, seat 106 can be mounted to floor portion 105 in a manner that allows movement of seat 106 with respect to floor portion 105. For example, seat 106 may be mounted to floor portion 105 in a manner that allows a driver to slide seat 106 in a forwards and backwards direction. This arrangement can allow a driver to adjust seat 106 to a comfortable driving position.

In an exemplary embodiment, interior portion 100 includes mounting system 108. In one embodiment, mounting system 108 can be a sliding rail type mounting system. In some cases, mounting system 108 can include first sliding rail 110 and second sliding rail 112 that are associated with medial side 114 and lateral side 116 of seat 106, respectively. In particular, first sliding rail 110 and second sliding rail 112 can be mounted in a direction extending between a front and back of the motor vehicle. With this arrangement, a driver can slide seat 106 forwards and rearwards to enhance the comfort of the driver while operating the motor vehicle.

Figure 2:
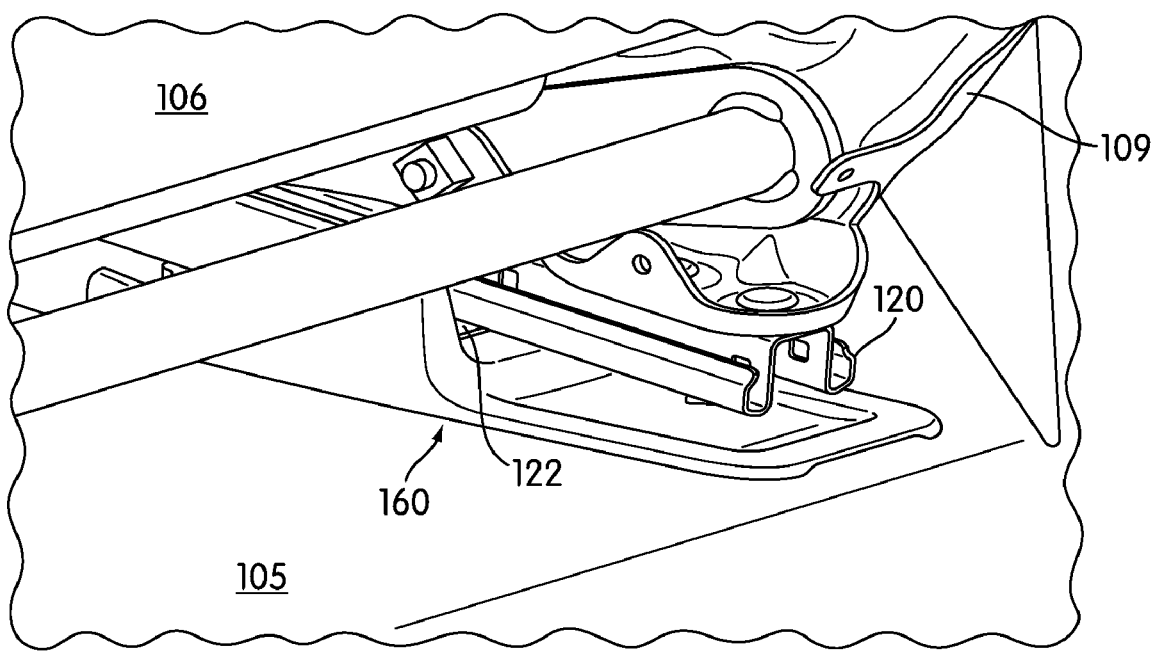
FIG. 2 is an assembled isometric view of an exemplary embodiment of a portion of a mounting system.
Figure 3:
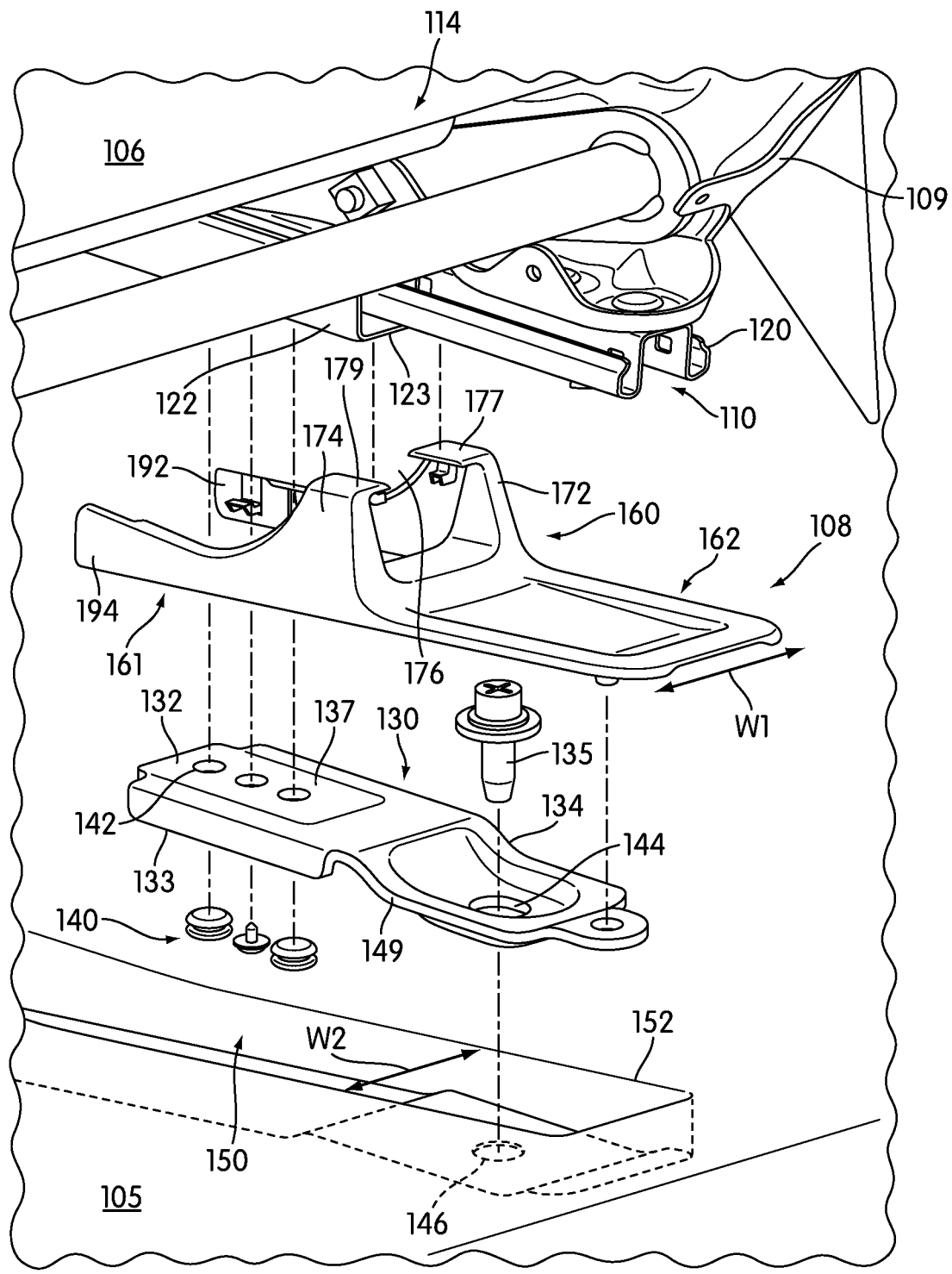
FIG. 3 is an exploded isometric view of an exemplary embodiment of a portion of a mounting system.

FIGS. 2 and 3 illustrate enlarged views of an exemplary embodiment of a portion of mounting system 108. In particular, FIG. 2 illustrates an assembled isometric view of an exemplary embodiment of a portion of mounting system 108, while FIG. 3 illustrates an exploded isometric view of an exemplary embodiment of a portion of mounting system 108. Although FIGS. 2 and 3 illustrate the components of mounting system 108 associated with medial side 114 of seat 106, the following discussion may be similarly applied to components of mounting system 108 on lateral side 116 of seat 106.

Referring to FIGS. 2 and 3, mounting system 108 may include first sliding rail 110. In some cases, first sliding rail 110 can include upper rail 120 and lower rail 122. In this embodiment, upper rail 120 may have a cross-sectional shape that engages with lower rail 122 in a manner that allows upper rail 120 to slide with respect to lower rail 122.

In some embodiments, upper rail 120 may be fixedly mounted to lower assembly 109 of seat 106. In some cases, upper rail 120 may be secured to lower assembly 109 using some type of fastener including, but not limited to, screws, bolts, nails, rivets as well as other types of fasteners. In still other embodiments, upper rail 120 can be welded directly to lower assembly 109 of seat 106.

In some embodiments, lower rail 122 may be configured to mount to floor portion 105. In some cases, lower rail 122 may be mounted directly to floor portion 105 using one or more fasteners. In other cases, lower rail 122 may be mounted to floor portion 105 using a mounting bracket of some kind. In an exemplary embodiment, lower rail 122 may be attached to floor portion 105 using a mounting foot member that may be associated with an end portion of lower rail 122.

In some embodiments, mounting system 108 can include mounting foot member 130. In some cases, mounting foot member 130 can be configured as a mounting bracket for fastening two or more components together. In an exemplary embodiment, mounting foot member 130 can be configured to mount lower rail 122 to floor portion 105.

In some embodiments, mounting foot member 130 may include first portion 132 for mounting to rearward portion 123 of lower rail 122. Generally, first portion 132 can have any shape. In some cases, first portion 132 can include lower lip portion 133. In addition, first portion 132 can include upper mounting surface 137 that is configured to contact lower rail 122. With this arrangement, lower lip portion 133 provides support for upper mounting surface 137, which may be raised slightly from floor portion 105 in order to engage with lower rail 122.

In some embodiments, mounting foot member 130 may also include second portion 134 configured to mount to floor portion 105. Generally, second portion 134 can have any shape. In some cases, second portion 134 can include bend 149 that allows second portion 134 to be lowered with respect to first portion 132. With this arrangement, a lower surface of second portion 134 may be configured to confront floor portion 105.

Mounting foot member 130 can be attached to lower rail 122 using any methods known in the art. In some cases, one or more fasteners can be used to fasten first portion 132 of mounting foot member 130 to lower rail 122. In other cases, first portion 132 of mounting foot member 130 can be welded to lower rail 122. In an exemplary embodiment, first fastener set 140 can be used to fixedly attach first portion 132 to lower rail 122. In particular, first fastener set 140 may include three fasteners that may be inserted through fastener holes 142 of first portion 132. Furthermore, each fastener of first fastener set 140 may be configured to insert into holes disposed in lower rail 122.

Although the exemplary embodiment of first fastener set 140 includes three fasteners, in other embodiments, first fastener set 140 can include any number of fasteners. Furthermore, it should be understood that the fasteners of first fastener set 140 could be any type of fasteners known in the art include screws, nuts and bolts, nails, rivets, as well as other types of fasteners.

Second portion 134 of mounting foot member 130 can be attached to floor portion 105 using any method known in the art. In some cases, second portion 134 can be attached to floor portion 105 using one or more fasteners. In other cases, second portion 134 can be welded directly to floor portion 105. In an exemplary embodiment, second portion 134 of mounting foot member 130 can be attached to floor portion 105 using fastener 135. In some cases, second portion 134 of mounting foot member 130 may include fastener hole 144 that is configured to receive fastener 135. Furthermore, floor portion 105 can include receiving hole 146 for receiving fastener 135. Although a single fastener is used in the current embodiment for attaching mounting foot member 130 to floor portion 105, in other embodiments, more than one fastener may be used. Furthermore, fastener 135 can be any type of fastener including, but not limited to a screw, a bolt, a rivet as well as any other type of fastener. In an exemplary embodiment, fastener 135 is a bolt type fastener.

In the exemplary embodiment, mounting system 108 may be mounted into recessed groove 150 of floor portion 105. In particular, mounting foot member 130 may be mounted within recessed groove 150. This arrangement allows a lower profile for mounting system 108 in contrast to traditional mounting systems that are mounted above a floor portion.

A mounting system including a mounting foot member that is disposed in a recessed groove can include provisions for covering the mounting foot member. In some embodiments, a mounting system can include a covering member that covers the mounting foot member. Using a covering member can help provide a substantially continuous surface for a floor portion with a recessed groove. In addition, a covering member can help prevent dirt from collecting inside the recessed groove, which may interfere with the fastening of a mounting foot member to a floor portion.

In an exemplary embodiment, mounting system 108 can include covering member 160. In some cases, covering member 160 may be disposed over mounting foot member 130. Furthermore, in an assembled position, covering member 160 may be configured to sit on top of recessed groove 150. With this arrangement, covering member 160 can provide a covering for mounting foot member 130. In addition, covering member 160 may provide a substantially continuous upper surface for floor portion 105 at recessed groove 150.

For consistency and convenience, directional adjectives are employed throughout this detailed description corresponding to the illustrated embodiments. These directional adjectives may be used with respect to one or more components of a mounting system including, for example, a covering member. The term "longitudinal" as used throughout this detailed description and in the claims refers to a direction extending a length of component. Also, the term "lateral" as used throughout this detailed description and in the claims refers to a direction extending a width of a component. Furthermore, the term "vertical" as used throughout this detailed description and in the claims refers to a direction generally perpendicular to a lateral and longitudinal direction. It should be understood that the terms longitudinal, lateral and vertical may also be applied to any components discussed in this detailed description including a sliding rail, a covering member, a mounting foot member as well as any other component.

Covering member 160 can include covering portion 162. Generally, covering portion 162 can have a size and shape that corresponds to rearward portion 152 of recessed groove 150. In particular, covering portion 162 can have width W1 that is slightly larger than width W2 of recessed groove 150. By using a slightly larger width for covering portion 162, covering portion 162 can be configured to rest on the edge of recessed groove 150. Covering portion 162 can also have a length that is configured to substantially cover any exposed portions of rearward portion 152 of recessed groove 150 once mounting system 108 has been fully assembled.

In some cases, covering member 160 can also include attachment portion 161 disposed adjacent to covering portion 162. In the exemplary embodiment, attachment portion 161 includes first upwardly extending portion 172 and second upwardly extending portion 174 that may be associated with a sliding rail of a mounting system. In some cases, first upwardly extending portion 172 and second upwardly extending portion 174 can be shaped in a manner to wrap around sidewalls of lower rail 122. In particular, first upwardly extending portion 172 can include first laterally directed portion 177 and second upwardly extending portion 174 can include second laterally directed portion 179. In an exemplary embodiment, first laterally directed portion 177 and second laterally directed portion 179 can be configured to wrap over side walls of lower rail 122.

In some embodiments, first upwardly extending portion 172 and second upwardly extending portion 174 can include provisions for receiving first sliding rail 110. In an exemplary embodiment, first upwardly extending portion 172 and second upwardly extending portion 174 can be spaced apart by opening 176 that provides clearance for upper rail 120 to extend through.

In some embodiments, a covering member can include provisions for attaching to a sliding rail. In some cases, one or more upwardly extending portions can be configured with one or more fasteners for attaching to a portion of a sliding rail. In an exemplary embodiment, each upwardly extending portion can include a tab-like fastener that is configured to engage with, and fasten to, a portion of a sliding rail.

Figure 4:
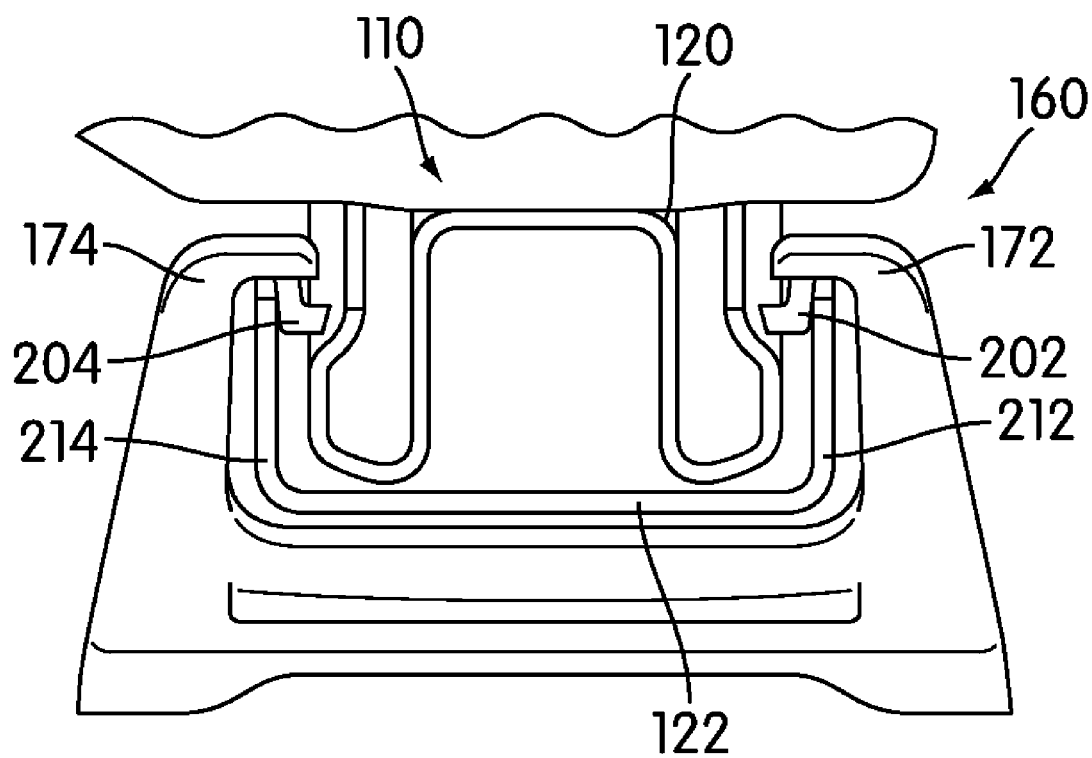
FIG. 4 is a plan view of an exemplary embodiment of a covering member attached to a sliding rail.

FIG. 4 illustrates a plan view of an exemplary embodiment of covering member 160 attached to first sliding rail 110. Referring to FIG. 4, first upwardly extending portion 172 can include first fastening member 202. Generally, first fastening member 202 can be any type of fastener configured to engage with lower rail 122. In some cases, first fastening member 202 may be a tab-like fastener that is configured to wrap around first sidewall 212 of lower rail 122. In a similar manner, second upwardly extending portion 174 can include second fastening member 204. In particular, second fastening member 204 may be a similar tab-like fastener that is configured to wrap around second sidewall 214 of lower rail 122. With this arrangement, first upwardly extending portion 172 and second upwardly extending portion 174 can be fastened directly to opposing sides of lower rail 122 of first sliding rail 110.

Referring back to FIG. 3, attachment portion 161 may include first longitudinally extending portion 192 and second longitudinally extending portion 194 that are disposed opposite of covering portion 162. In particular, first longitudinally extending portion 192 may extend from first upwardly extending portion 172, while second longitudinally extending portion 194 may extend from second upwardly extending portion 174. In some cases, first longitudinally extending portion 192 may be substantially perpendicular to first upwardly extending portion 172. Likewise, second longitudinally extending portion 194 may be substantially perpendicular to second upwardly extending portion 174.

In some embodiments, a covering member can include provisions for attaching to a mounting foot member. In some cases, one or more longitudinally extending portions can be configured with one or more fasteners for attaching to a portion of a sliding rail. In an exemplary embodiment, each longitudinally extending portion can include a tab-like fastener that is configured to engage with, and fasten to, a portion of a mounting foot member.

Figure 5:
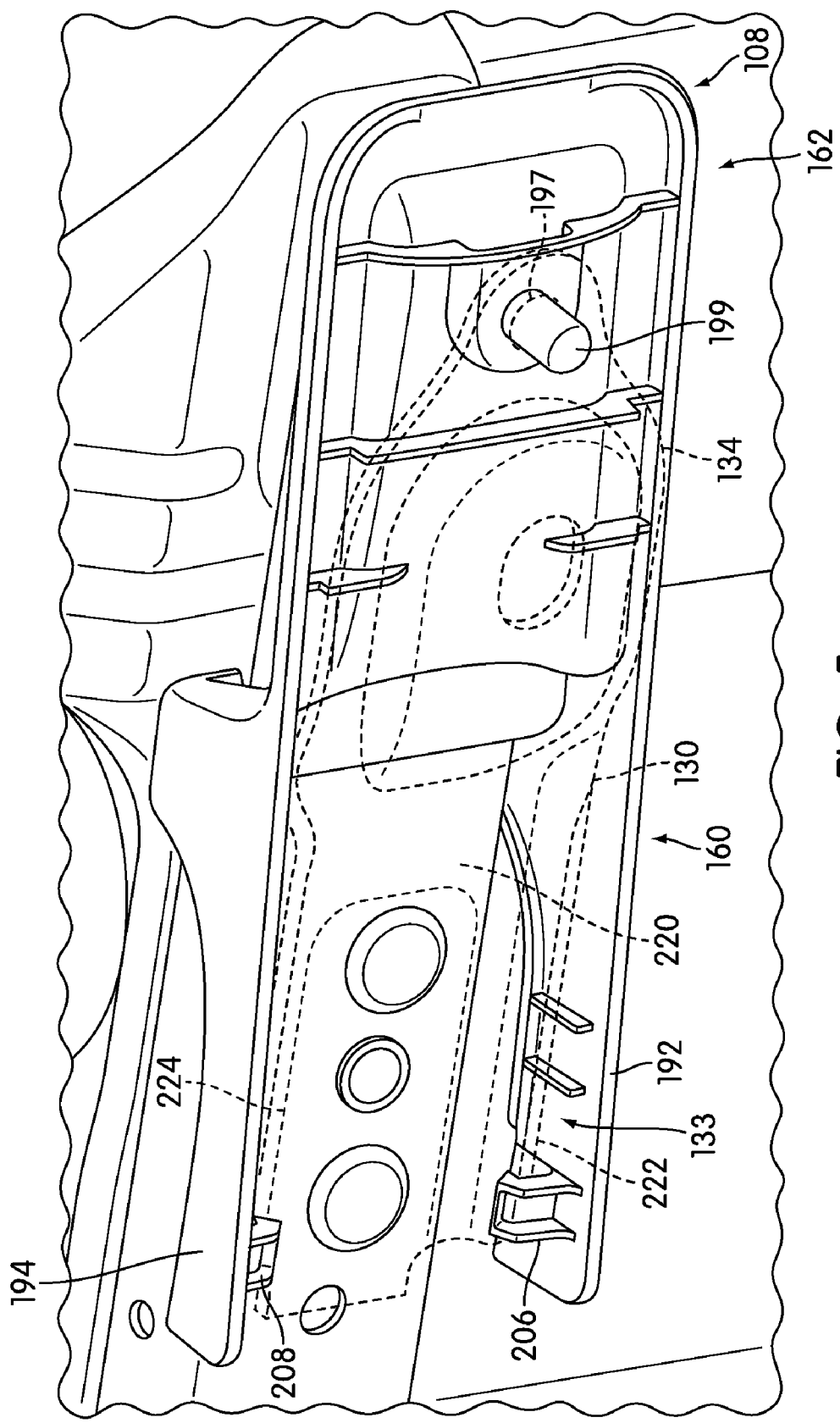
FIG. 5 is an assembled view of an exemplary embodiment of a mounting system from underneath a mounting foot member that is illustrated in phantom.

FIG. 5 illustrates an assembled view of an exemplary embodiment of mounting system 108 from underneath mounting foot member 130, which is shown in phantom for purposes of illustration. In some embodiments, covering member 160 can include third fastening member 206 and fourth fastening member 208 that are disposed on first longitudinally extending portion 192 and second longitudinally extending portion 194, respectively. Generally, third fastening member 206 and fourth fastening member 208 can be any type of fasteners configured to engage a mounting foot member. In an exemplary embodiment, third fastening member 206 and fourth fastening member 208 can be tab-like fasteners that are configured to engage with mounting foot member 130.

As illustrated in FIG. 5, third fastening member 206 and fourth fastening member 208 may be configured to fasten to lower surface 220 of first portion 132 of mounting foot member 130. In particular, third fastening member 206 and fourth fastening member 208 may be configured to engage first lower lip 222 and second lower lip 224 of lower lip portion 133, respectively. In other words, third fastening member 206 and fourth fastening member 208 are configured to engage opposing sides of first portion 132 of mounting foot member 130. With this arrangement, covering member 160 may be prevented from lifting up in a substantially vertical direction.

In some cases, covering portion 162 can also include provisions for associating with mounting foot member 130. In one embodiment, covering portion 162 can include mounting pin 199. In some cases, mounting pin 199 may be configured to insert into hole 197 disposed on second portion 134 of mounting foot member 130. In some embodiments, mounting pin 199 may function as an alignment feature. In other embodiments, however, mounting pin 199 may assist in fastening covering portion 162 to mounting foot member 130.

A covering member can include provisions for maintaining clearance between a covering portion of the covering member and an upper rail that may be configured to slide above the covering portion, especially in embodiments where a mounting foot member is disposed below floor level. In some cases, a covering member can have a shape that helps maintain consistent spacing between the covering portion and the upper rail. In an exemplary embodiment, a covering member may include a recessed central portion to provide substantial spacing between the covering portion and an upper rail that moves above the covering portion.

Figure 6:
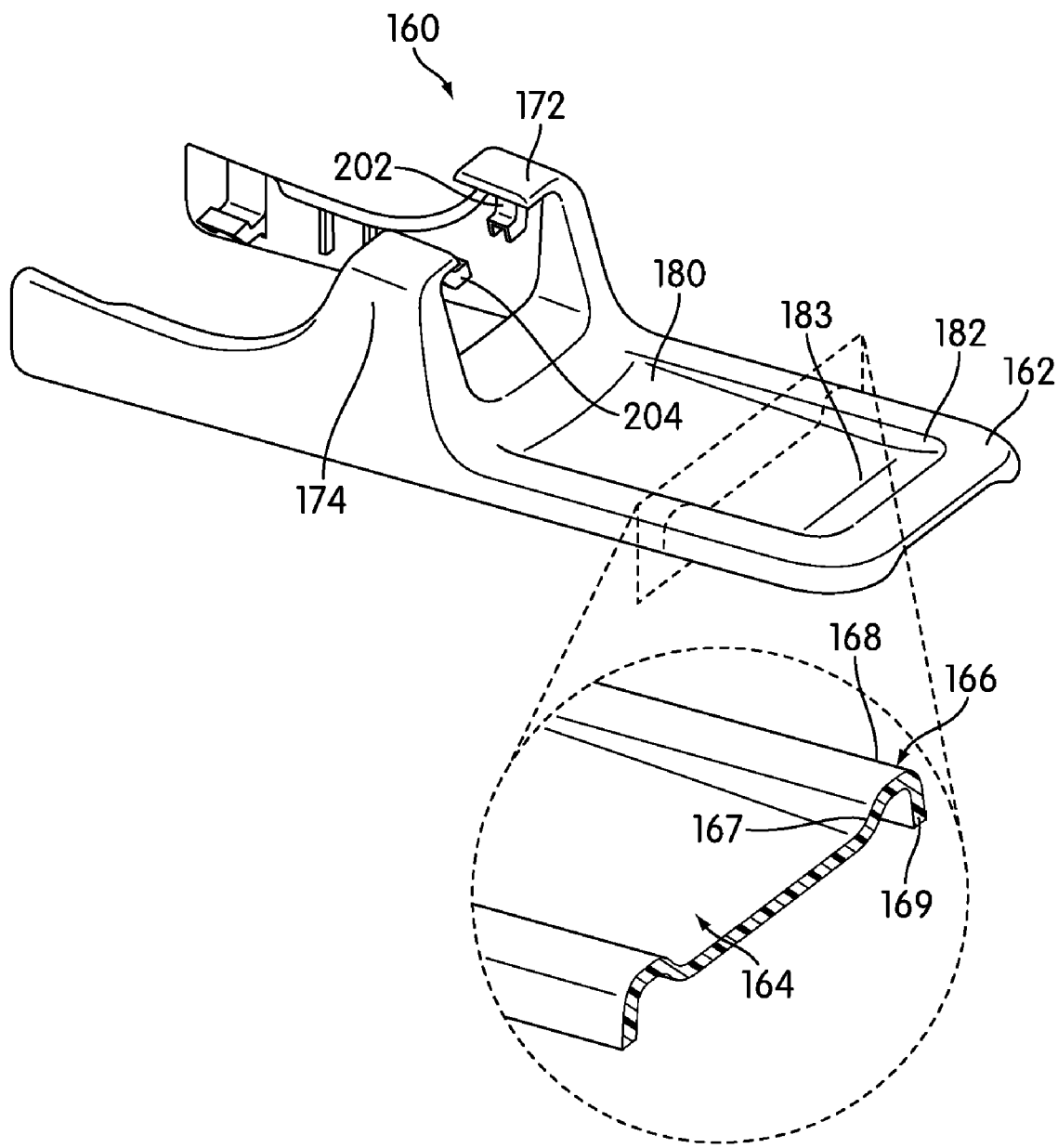
FIG. 6 is an isometric view of an exemplary embodiment of a covering member with an enlarged cross sectional view of a covering portion of the covering member.

Referring now to FIG. 6, covering portion 162 can have a concave, or recessed, shape to provide increased clearance between covering member 160 and first sliding rail 110, as illustrated in FIG. 2. As illustrated in an enlarged cross sectional view in FIG. 6, covering portion 162 includes central portion 164 and peripheral portion 166, which extends outwards from central portion 164.

In some cases, central portion 164 may be configured to slope downwards from first end portion 180 of covering portion 162 to intermediate portion 183 of covering portion 162. In addition, central portion 164 may slope upwards from intermediate portion 183 to second end portion 182 of covering portion 162. In other words, the depth of central portion 164 with respect to peripheral portion 166 increases from first end portion 180 to intermediate portion 183. Also, the depth of central portion 164 increases from second end portion 182 to intermediate portion 183. With this arrangement, central portion 164 may be recessed to provide clearance between covering portion 162 and upper rail 120.

As seen in FIG. 6, peripheral portion 166 includes interior peripheral wall 167 that joins with central portion 164. In addition, peripheral portion 166 includes upper peripheral portion 168 that is raised with respect to central portion 164. Also, peripheral portion 166 includes exterior peripheral wall 169 that extends below central portion 164. In some cases, this arrangement provides a U-like shape for peripheral portion 166. In an exemplary embodiment, exterior peripheral wall 169 may have a substantially constant height to provide a regular, or flat, contact surface that engages the edges of a recessed groove.

Figure 7:
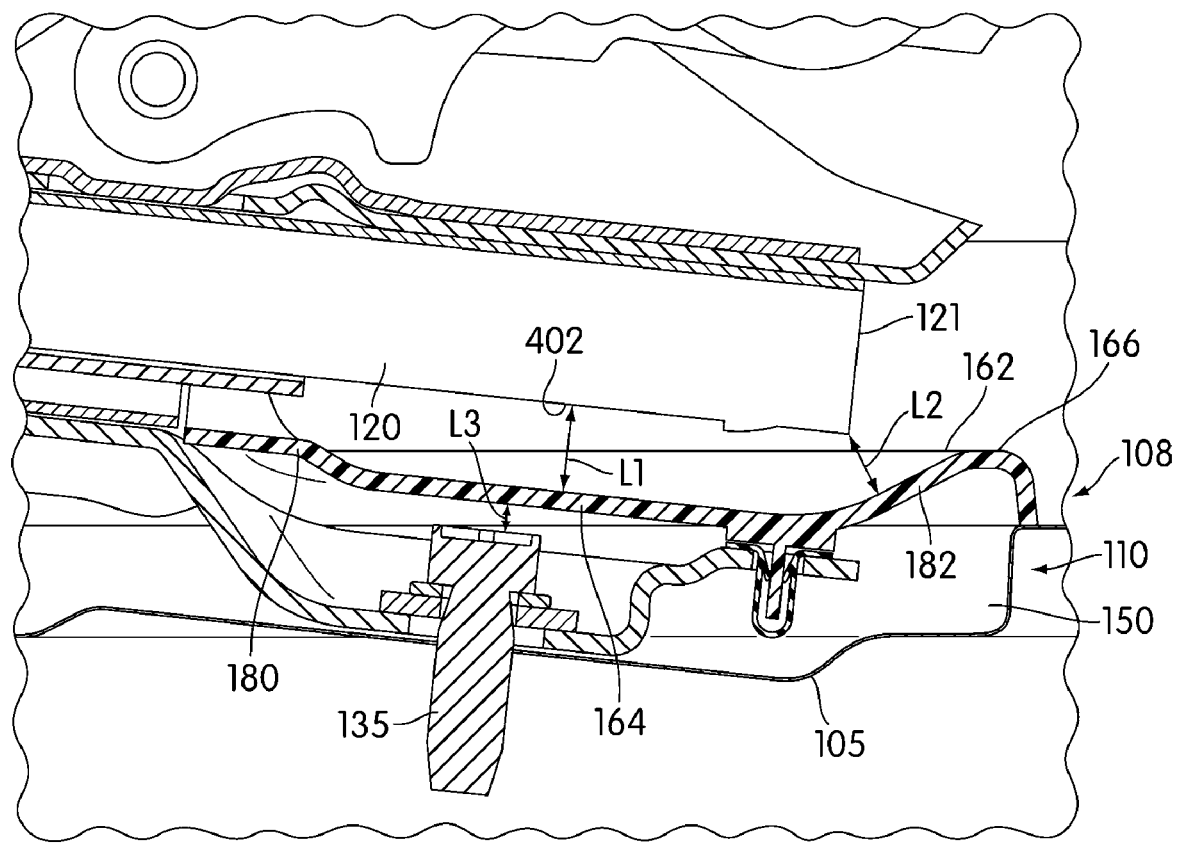
FIG. 7 is a cross sectional view of an exemplary embodiment of a portion of mounting system.

FIG. 7 is a cross sectional view of an exemplary embodiment of a portion of mounting system 108. Referring to FIG. 7, the shape of covering portion 162 can help facilitate increased clearance between covering member 160 and upper rail 120. In this embodiment, upper rail 120 is disposed in an extended position. Because first sliding rail 110 is mounted in recessed groove 150, upper rail 120 may be slightly angled so that rearward end 121 of upper rail 120 is tilted downwards.

In an exemplary embodiment, the recessed shape of central portion 164 of covering portion 162 is configured to provide substantially consistent clearance between upper rail 120 and central portion 164. In particular, intermediate portion 402 of upper rail 120 is separated from central portion 164 of covering portion 162 by distance L1. Likewise, rearward end 121 of upper rail 120 is separated from central portion 164 of covering portion 162 by distance L2. In some embodiments, distance L1 and distance L2 could have different values. In an exemplary embodiment, distance L1 and distance L2 are substantially similar even though rearward end 121 is lower than intermediate portion 402, since central portion 164 also slopes downwardly from first end portion 180 to second end portion 182. In one embodiment, distance L1 and distance L2 may both be approximately 10 millimeters. In other embodiments, however, these distances can vary. With this arrangement, covering portion 162 is prevented from interfering with upper rail 120 as upper rail 120 slides backwards and forwards with respect to floor portion 105.

In this embodiment, covering portion 162 is disposed between upper rail 120 and mounting foot member 130. It will be understood that while central portion 164 may slope downwardly, covering portion 162 can still be configured to maintain clearance between central portion 164 and fastener 135. In an exemplary embodiment, for example, fastener 135 is disposed adjacent to first end portion 180 of covering portion 162, which is higher than second end portion 182 in a substantially vertical direction. In this case, fastener 135 is separated from central portion 164 by distance L3. In an exemplary embodiment, distance L3 may be approximately 3.8 millimeters. However, in other embodiments, the value of distance L3 can vary.

In different embodiments, the shape of a covering member can vary according to various factors. For example, in some embodiments, the shape of a covering member can be different according to the region of a motor vehicle in which the covering member will be installed. In some cases, mounting systems for a driver seat may be slightly different than mounting systems for a passenger seat. In order to accommodate differences in these mounting systems, a covering member associated with a driver seat may be different from a covering member associated with a passenger seat.

Referring back to FIG. 1, passenger side 104 of interior portion 100 may be associated with first covering member 191 and second covering member 193. In some cases, first covering member 191 and second covering member 193 may be configured to cover mounting feet members associated with a passenger seat. For purposes of illustration, only first covering member 191 and second covering member 193 are shown.

Figure 8:
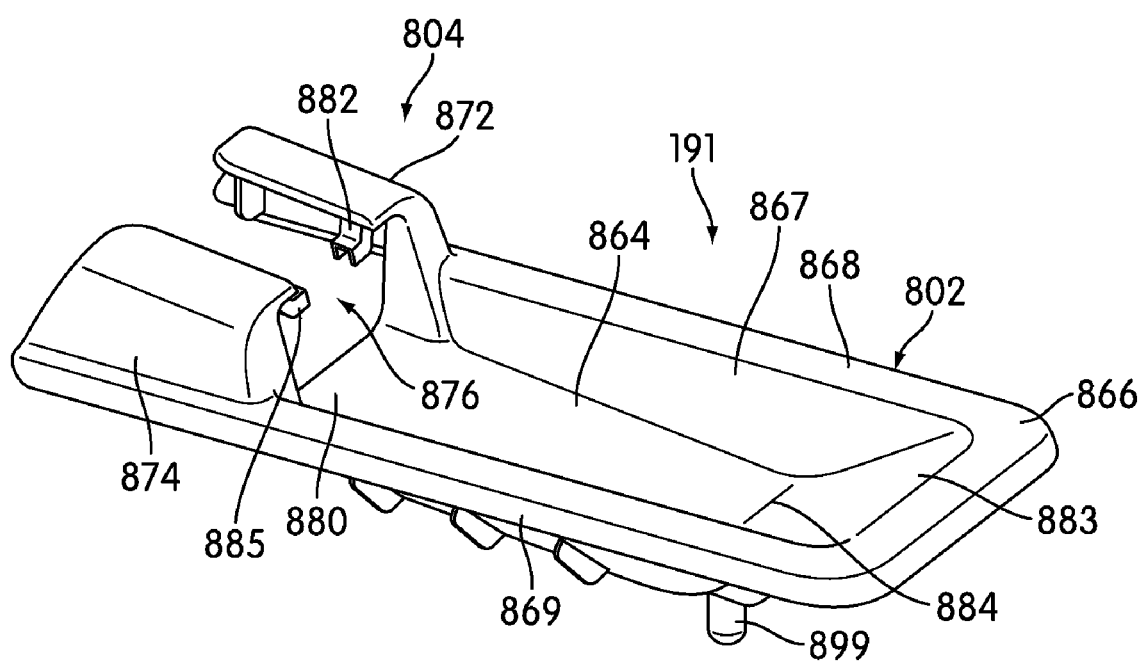
FIG. 8 is an isometric view of an exemplary embodiment of a covering member.

FIG. 8 illustrates an isometric view of an exemplary embodiment of first covering member 191. It will be understood that in some embodiments, the shape, size and overall design of first covering member 191 may be substantially similar to the shape, size and overall design of second covering member 193, as illustrated in FIG. 1. In other embodiments, however, some characteristics may vary between first covering member 191 and second covering member 193.

First covering member 191 may include covering portion 802 and attachment portion 804. In some embodiments, attachment portion 804 can include provisions for attaching to a sliding rail. In the exemplary embodiment, attachment portion 804 includes first upwardly extending portion 872 and second upwardly extending portion 874 that may be associated with a sliding rail of a mounting system. In some cases, first upwardly extending portion 872 and second upwardly extending portion 874 can be shaped in a manner to wrap around sidewalls of a lower rail. Furthermore, first upwardly extending portion 872 and second upwardly extending portion 874 can be spaced apart by opening 876 that provides clearance for an upper rail to extend through.

In some cases, first upwardly extending portion 872 and second upwardly extending portion 874 can be provided with first fastening member 882 and second fastening member 885, respectively. It will be understood that these fastening members can be configured to engage opposing sidewalls of a lower rail in a similar manner to the covering member of the previous embodiment.

In contrast to the previous embodiment, however, attachment portion 804 may not include longitudinally extending portions. Instead, first upwardly extending portion 872 and second upwardly extending portion 874 are disposed on an end portion of first covering member 191 disposed opposite of covering portion 802.

A covering member can include provisions for attaching to a mounting foot member. In some embodiments, first covering member 191 can be provided with mounting pin 899 disposed on covering portion 802. In some cases, mounting pin 899 may be configured to engage a hole in a mounting foot member. Mounting pin 899 may serve as a locating feature, a fastening feature, or both, in some cases.

Covering portion 802 can have a concave, or recessed, shape to provide increased clearance between first covering member 191 and a sliding rail. In some cases, covering portion 802 includes central portion 864 and peripheral portion 866. Central portion 864 may be configured to slope downwards from first end portion 880 of covering portion 802 to intermediate portion 884 of covering portion 802. Then, central portion 864 may slope upwards from intermediate portion 884 to second end portion 883 of covering portion 802. In other words, the depth of central portion 864 with respect to peripheral portion 866 varies from first end portion 880 to second end portion 883. Furthermore, the deepest portion of central portion 864 occurs at intermediate portion 884, which may be disposed closer to second end portion 883 in some embodiments.

As seen in FIG. 8, peripheral portion 866 includes interior peripheral wall 867 that joins with central portion 864. In addition, peripheral portion 866 includes upper peripheral portion 868 that is raised with respect to central portion 864. Also, peripheral portion 866 includes exterior peripheral wall 869. In some cases, exterior peripheral wall 869 may extend below central portion 864. In other cases, however, exterior peripheral wall 869 may be disposed higher in a vertical direction than central portion 864. In an exemplary embodiment, exterior peripheral wall 869 may have a consistent vertical height in order to maintain a consistent outer edge for covering portion 802 to engage with a recessed groove.

Figure 9:
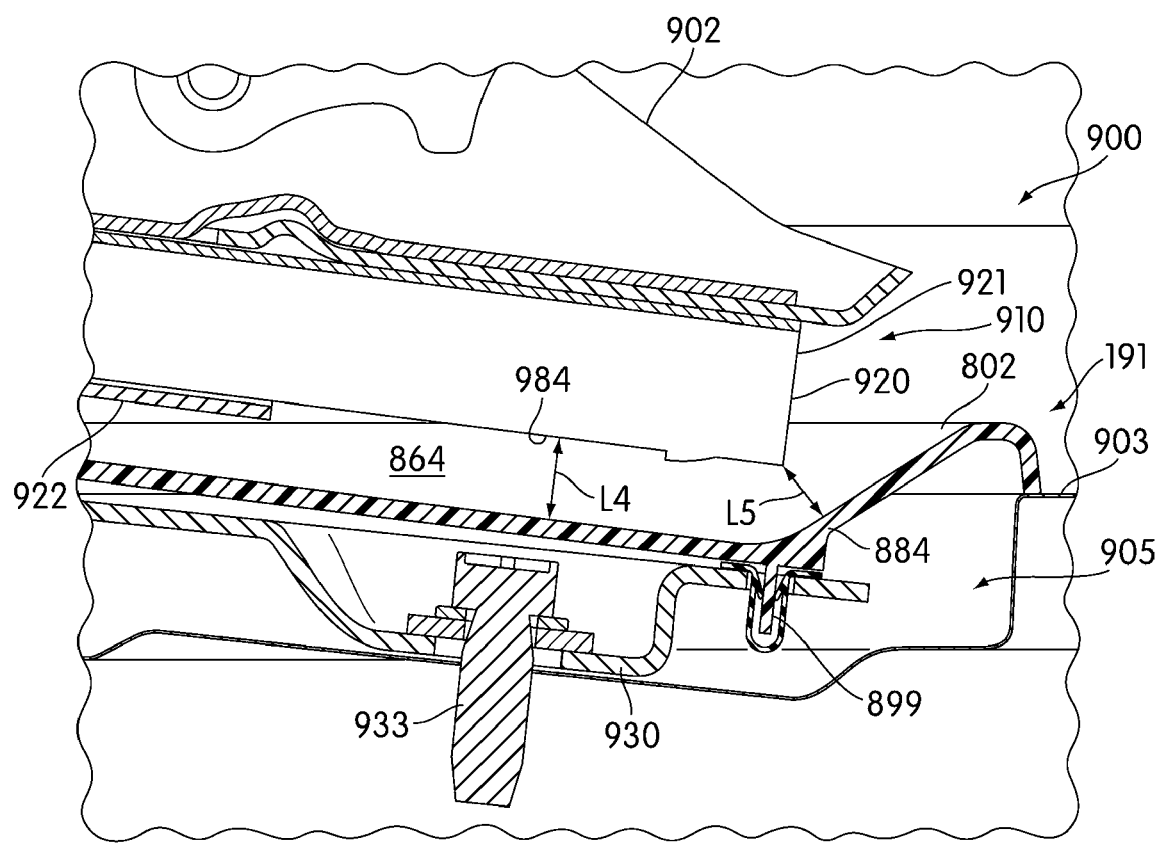
FIG. 9 is a cross sectional view of an exemplary embodiment of a portion of a mounting system associated with a seat of a motor vehicle.

FIG. 9 is a cross sectional view of an exemplary embodiment of a portion of mounting system 900 associated with seat 902 of a motor vehicle. In some cases, seat 902 could be a passenger seat. In this embodiment, mounting system 900 for seat 902 includes sliding rail 910, which further comprises upper rail 920 and lower rail 922. Furthermore, lower rail 922 is mounted to floor portion 903. In particular, lower rail 922 is mounted within groove 905 of floor portion 903.

In some cases, lower rail 922 may be mounted to floor portion 903 via mounting foot member 930, which may be substantially similar to mounting foot member 130 discussed above. In some cases, mounting foot member 930 may be fastened to floor portion 903 using fastener 933. Also, mounting foot member 930 may be fastened to floor portion 903 using additional fasteners (not shown).

Covering portion 802 can include provisions for associating with mounting foot member 930. As previously discussed, covering portion 802 can include mounting pin 899. In some cases, mounting pin 899 may be configured to insert into a hole of mounting foot member 930. In addition, first fastening member 882 and second fastening member 885 (see FIG. 8) may be configured to attach to lower rail 922 in a similar manner to the arrangement described for covering member 160.

Referring to FIG. 9, the shape of covering portion 802 can help facilitate increased clearance between first covering member 191 and upper rail 920. In this embodiment, upper rail 920 is disposed in an extended position. Because sliding rail 910 is mounted in groove 905, upper rail 920 may be slightly angled so that rearward end 921 of upper rail 920 is tilted downwards.

In an exemplary embodiment, the recessed shape of central portion 864 of covering portion 802 is configured to provide substantially consistent clearance between upper rail 920 and central portion 864. In particular, intermediate portion 984 of upper rail 920 is separated from central portion 864 of covering portion 802 by distance L4. Likewise, rearward end 921 of upper rail 920 is separated from central portion 864 of covering portion 802 by distance L5. In some embodiments, distance L4 and distance L5 could have different values. In an exemplary embodiment, distance L4 and distance L5 are substantially similar even though rearward end 921 is lower than intermediate portion 984, since central portion 864 also slopes downwardly from first end portion 880 to intermediate portion 884 (see FIG. 8). In one embodiment, distance L4 and distance L5 may both be approximately 10 millimeters. In other embodiments, however, these distances can vary. With this arrangement, covering portion 802 is prevented from interfering with upper rail 920 as upper rail 920 slides backwards and forwards with respect to floor portion 903.

In this embodiment, sliding rail 910 is titled downwards at a slightly greater angle than sliding rail 110 discussed in the previous embodiment. In some cases, the shape of first covering member 191 may accommodate this slightly steeper arrangement of a sliding rail. In particular, as previously discussed, central portion 864 of covering portion 802 may be substantially deeper than covering portion 162 of covering member 160. In particular, the depth of first covering member 191 as measured between intermediate portion 884 and second end portion 883 (see FIG. 8) is greater than the depth of covering member 160 as measured between intermediate portion 183 and second end portion 182 of covering portion 162 (see FIG. 6). With this arrangement, first covering member 191 may provide adequate clearance for sliding rail 910, which is angled more than sliding rail 110.

Generally, the shape of a covering portion can be varied in any manner. In different embodiments, the depth, length and width can all be modified. For example, the depth of the central portion can vary in any manner. Although the current embodiments include covering portions whose depths gradually increase from an end portion towards an intermediate portion, other embodiments can include depths that vary in other manners. By modifying the shape of a covering portion, a covering member can be configured to accommodate differences in a mounting configuration, including, but not limited to, differences in rail sizes, rail heights, rail angles, mounting foot shapes, mounting foot sizes, recessed groove shapes and sizes, as well as any other features of a mounting system.

In an exemplary embodiment, covering member 160 may be associated with a driver seat, while first covering member 191 may be associated with a passenger seat. In particular, the distinctions in shapes and structural features of each covering member may be useful for covering different types of rail configurations, floor cavities, and other features of a seat mounting system. In other embodiments, however, covering member 160 could be associated with any seat of a motor vehicle, including a passenger seat. Likewise, first covering member 191 could be associated with any seat of a motor vehicle, including a driver seat.

The covering members discussed in these embodiments can be manufactured in any manner known in the art. In one embodiment, for example, a covering member can be formed using a molding technique. In addition, a covering member can be made of any material including, but not limited to, plastic, rubber, wood, metal, as well as any other material or combination of materials. In some cases, the materials used for making a covering member can be selected according to the desired durability properties of the covering member.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A covering member for covering a mounting foot member in a motor vehicle, a recessed portion of the mounting foot member being disposed in a recessed groove of a floor portion of the motor vehicle, the covering member comprising:
    a covering portion;
    the covering portion including a central portion and a peripheral portion disposed outwards from the central portion; and
    wherein the central portion is disposed in the recessed groove and is recessed below the peripheral portion to provide substantial spacing between the central portion and a sliding rail when the sliding rail is in an extended position above the central portion.

2. The covering member according to claim 1, wherein the covering member includes at least one upwardly extending portion disposed adjacent to the covering portion and wherein the upwardly extending portion is configured to engage a lower rail of the sliding rail.

3. The covering member according to claim 2, wherein the covering member includes at least one longitudinally extending portion disposed opposite of the covering portion and wherein the longitudinally extending portion is substantially perpendicular to the upwardly extending portion.

4. The covering member according to claim 1, wherein a portion of the peripheral portion is disposed above the central portion.

5. The covering member according to claim 4, wherein a portion of the peripheral portion is disposed below the central portion.

6. The covering member according to claim 5, wherein the central portion is sloped with respect to the peripheral portion from a first end portion of the covering portion to an intermediate portion of the covering portion.

7. A mounting system for a seat of a motor vehicle, comprising:
    a sliding rail;
    a mounting foot member including a first portion configured to fasten to the sliding rail and a second portion configured to fasten to a floor portion of the motor vehicle within a recessed groove of the floor portion;
    a covering member including a covering portion configured to cover the mounting foot member, wherein the covering portion is disposed between the sliding rail and the mounting foot member when the sliding rail is in an extended position, and wherein the covering portion has a recessed shape to provide spacing between the covering portion and the sliding rail when the sliding rail is in the extended position;
    the covering member including an attachment portion disposed adjacent to the covering portion;
    the attachment portion including at least one upwardly extending portion including a first fastening member;
    the attachment portion including at least one longitudinally extending portion including a second fastening member; and
    wherein the first fastening member is configured to attach to a portion of the sliding rail and wherein the second fastening member is configured to attach to the first portion of the mounting foot member.

8. The mounting system according to claim 7, wherein the attachment portion includes a first upwardly extending portion having the first fastening member and a second upwardly extending portion having a third fastening member and wherein the first fastening member and the third fastening member are configured to engage opposing sides of the sliding rail.

9. The mounting system according to claim 8, wherein the attachment portion includes a first longitudinally extending portion having the second fastening member and a second longitudinally extending portion having a fourth fastening member and wherein the second fastening member and the fourth fastening member are configured to engage opposing sides of the first portion of the mounting foot member.

10. The mounting system according to claim 8, wherein a portion of the sliding rail is disposed between the first upwardly extending portion and the second upwardly extending portion.

11. The mounting system according to claim 7, wherein the first portion of the mounting foot member includes a lower lip portion and wherein the second fastening member is configured to engage the lower lip portion.

12. The mounting system according to claim 7, wherein the first fastening member and the second fastening member are both tab-like fasteners.

13. The mounting system according to claim 7, wherein the covering portion includes a mounting pin that is configured to engage a hole in the second portion of the mounting foot member.

14. A mounting system for a seat of a motor vehicle, comprising:
    a sliding rail, the sliding rail including a lower rail and an upper rail configured to slide with respect to the lower rail;
    a mounting foot member configured to fasten the lower rail to a recessed groove of a floor portion of the motor vehicle;
    a covering member including a covering portion configured to cover the mounting foot member;
    wherein the covering portion is disposed between the upper rail and the mounting foot member when the sliding rail is in an extended position; and
    wherein the covering portion has a recessed shape to provide substantial spacing between the covering portion and the upper rail.

15. The mounting system according to claim 14, wherein the covering portion is disposed above the recessed groove.

16. The mounting system according to claim 15, wherein the covering portion is configured to cover a portion of the recessed groove.

17. A mounting system for a seat of a motor vehicle, comprising:
    a sliding rail, the sliding rail including a lower rail and an upper rail configured to slide with respect to the lower rail;
    a mounting foot member configured to fasten the lower rail to a recessed groove of a floor portion of the motor vehicle;
    a covering member including a covering portion configured to cover the mounting foot member;

wherein the covering portion is disposed between the upper rail and the mounting foot member when the sliding rail is in an extended position; and wherein the covering member includes an attachment portion, the attachment portion including an upwardly extending portion configured to engage the lower rail and the attachment portion including a longitudinally extending portion configured to engage the mounting foot member.

18. The mounting system according to claim 17, wherein the upwardly extending portion is fastened to the lower rail using a tab-like fastener disposed on the upwardly extending portion.

19. The mounting system according to claim 17, wherein the longitudinally extending portion is fastened to a lower lip portion of the mounting foot member using a tab-like fastener disposed on the longitudinally extending portion.

20. The mounting system according to claim 14, wherein the covering member includes an attachment portion, the attachment portion including an upwardly extending portion configured to engage the lower rail and the attachment portion including a longitudinally extending portion configured to engage the mounting foot member.

* * * * *